(No Model.)
W. E. KENNEDY.
COMBINED CORN AND COTTON PLANTER.
No. 350,887. Patented Oct. 12, 1886.
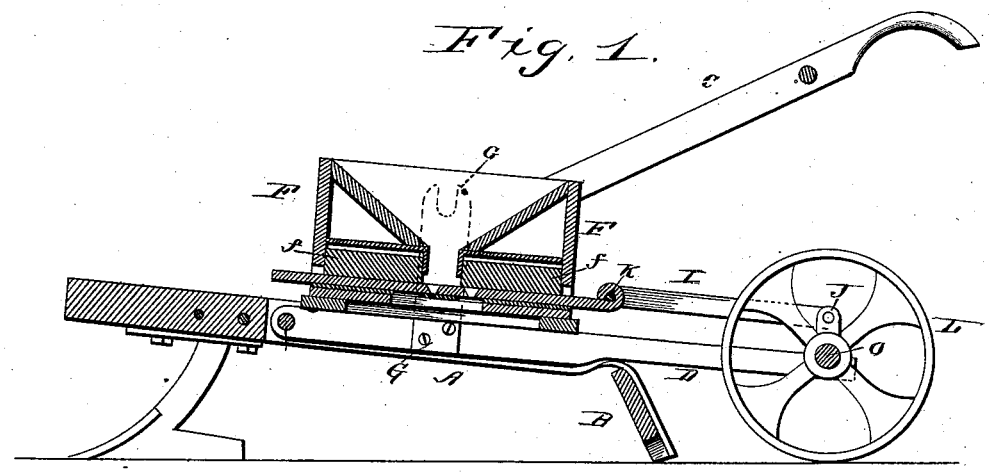
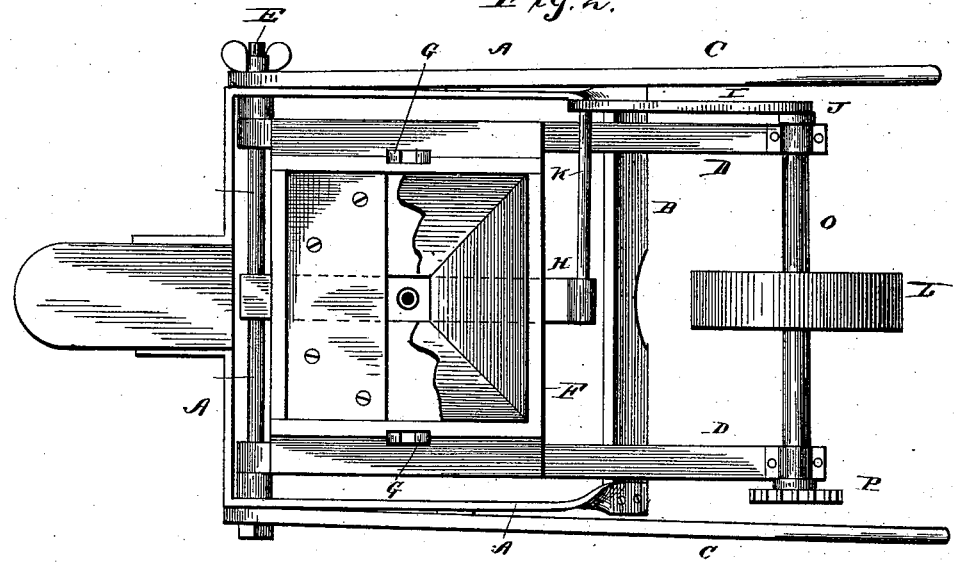
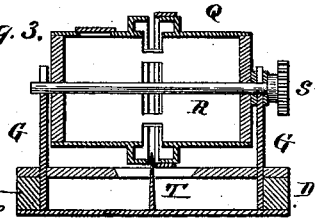
Witnesses
Inventor
Warren E. Kennedy
By his Attorney

UNITED STATES PATENT OFFICE.

WARREN E. KENNEDY, OF MARTIN'S STATION, ALABAMA.

COMBINED CORN AND COTTON PLANTER.

SPECIFICATION forming part of Letters Patent No. 350,887, dated October 12, 1886.

Application filed January 21, 1886. Serial No. 189,328. (No model.)

*To all whom it may concern:*

Be it known that I, WARREN E. KENNEDY, a citizen of the United States, residing at Martin's Station, in the county of Dallas and State of Alabama, have invented certain new and useful Improvements in Combined Corn and Cotton Planters, of which the following is a specification, reference being had therein to the accompanying drawings.

My invention relates to machines for distributing seed; and the object I have in view is to construct one which will be simple and inexpensive, as also one readily convertible to adapt it to the distribution of different kinds of seed.

In the accompanying drawings, making part of this specification, Figure 1 represents a longitudinal vertical section, Fig. 2 a plan view, and Fig. 3 a section, of a cotton-box with some of its attachments.

In this machine there are two frames, A and D. Frame A consists of a front bar, to which the tongue is attached, two side bars, and an end bar, which acts as a scraping-coverer. The handles C C are secured to this frame A and braced in any suitable manner.

D represents the other frame, which is pivoted or hinged to the frame near its forward end.

E represents a rod having a head at one end and a thumb-screw at the other. This rod passes through the forward end of the handles and then through the two frames, thus pivoting or hinging said frames together.

F represents a seed-box intended for corn or peas, or such seed. This box is provided with two broad grooves vertically situated in its sides.

G G represent standards which are secured to the frame D. These standards take into the grooves in the sides of the box, and serve to hold said box in its place upon the frame D. The upper ends of the standards are slotted to receive and form bearings for the shaft of the cotton-box.

O represents a shaft, having its ends journaled upon the rear end of frame D. This shaft is provided with a sprocket-wheel, P, a driving-wheel, L, and a crank, J. A connecting-rod, I, connects the crank to a rod, K, which runs at right angles to it and connects to a seed-slide, H. When the crank revolves with its shaft, it imparts, through rods I and K, a reciprocating movement to the seed-slide H. This slide passes into the rear of the seed-box near its bottom, and is provided with seed-openings, according to what kind of seed is to be distributed.

The opening in the hopper leading to the slide is central, as usual. Upon each side of this opening and upon top of the seed-slide are two weights or cut-offs, $f\ f$, which rest in suitable boxes or recesses beneath the seed-box, and have a free up-and-down movement. They act as cut-offs for the seed-slide as it plies forward and backward under them. A rigid cut-off is liable to cut or break the seed; but these weights, while not being heavy, are sufficiently heavy to cut the grain off, and at the same time rise and fall, when necessary, to allow the grain to pass under them. As corn is sometimes turned endwise or edgewise in an already full opening, it is necessary to allow some compensation in its passage from the box. The scraper B covers the grain, while the driving-wheel L rolls over and packs the earth.

Q represents a cotton-box divided at its center, and having a shaft, R, passing through, on one end of which is a sprocket-wheel, S. The shaft rests when in use in the slots in the upper ends of the standards G. A belt from wheel P to wheel S serves to revolve the cotton-box.

T represents a stirring-pin secured upon a cross-bar in the frame D. This pin projects up through the central opening in box Q, and serves to stir the seed and facilitate its discharge.

Both boxes are so constructed that they may be readily and quickly changed to adapt the machine to different uses.

An opening blade or plow is secured to the forward end of frame A, as is usual.

Having thus fully described my invention, what I claim as new, and desire to secure by Letters Patent, is—

1. The frames A and D, hinged together as represented, the frame D carrying a seed-slide-actuating mechanism and provided with slotted standards G G, adapted to hold and carry seed-boxes for distributing different kinds of seed, substantially as set forth.

2. The combination, with the frame A, of the frame D, hinged to the said frame A and carrying the standards G, the seed-slide and its actuating mechanism, and the seed-box F, which is secured between the standards G, and is provided with the adjustable weights or cut-offs $f$, substantially as herein specified.

In testimony whereof I affix my signature in presence of two witnesses.

WARREN E. KENNEDY.

Witnesses:
   CHAS. D. DAVIS,
   WILLIAM DOW.